Dec. 4, 1934.   J. P. JOHNSON   1,983,134
METHOD OF PRODUCING ROLLER BEARINGS
Filed Dec. 26, 1930
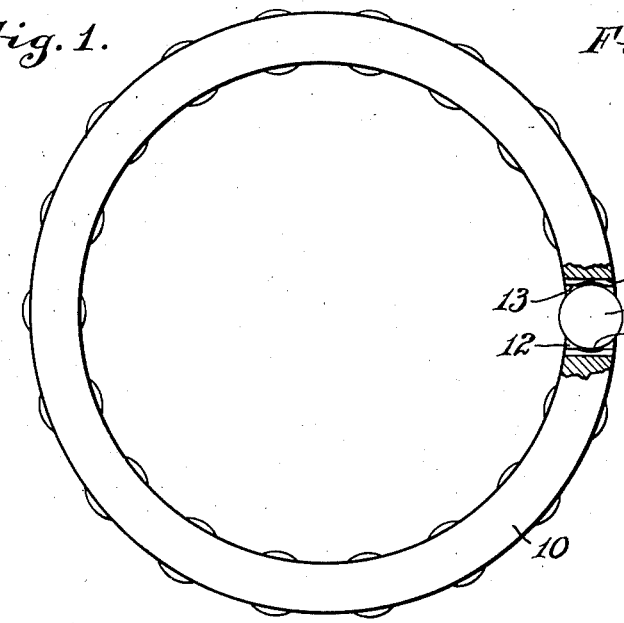
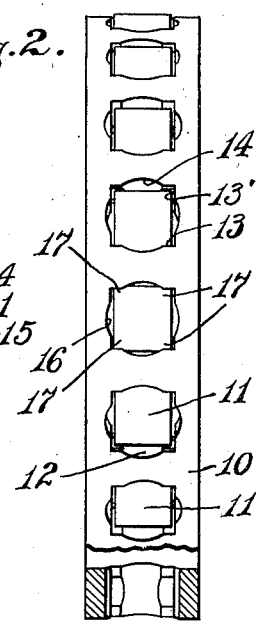
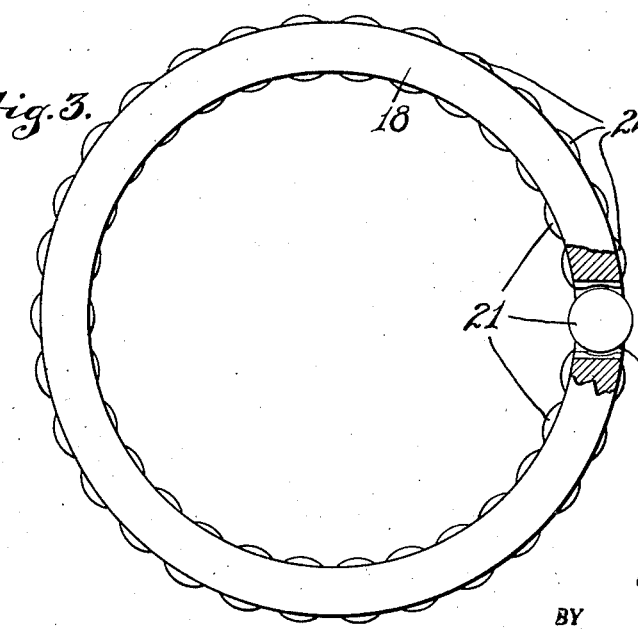
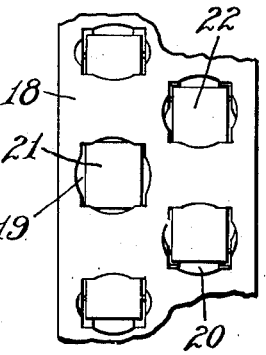
INVENTOR.
James P. Johnson,
BY
Hood + Hahn.
ATTORNEYS Patented Dec. 4, 1934

1,983,134

UNITED STATES PATENT OFFICE 1,983,134

METHOD OF PRODUCING ROLLER BEARINGS

James P. Johnson, Cleveland, Ohio

Application December 26, 1930, Serial No. 504,781

3 Claims. (Cl. 29—148.4)

The present application relates to the manufacture of roller bearings, and more particularly to a process of making a bearing comprising an integral retaining ring, carrying a plurality of rollers, each of said rollers projecting from at least one peripheral surface of said ring.

An object of the invention is to provide a bearing of the character described in which friction between the rollers and the retaining ring is reduced to a minimum. A further object of the invention is to provide a bearing of the character described which shall be unusually inexpensive to manufacture and which shall, nevertheless, be highly accurate and true in its overall dimensions. A further object of the invention is to provide a bearing of the character described in which the rollers may be snapped into the retaining ring. A still further object of the invention is to provide a novel method of constructing such a bearing. Further objects of the invention will appear as the description proceeds.

In the drawing forming part of the present application.

Fig. 1 is an elevation of a bearing constructed in accordance with my invention, a portion thereof being shown in section for clarity of illustration;

Fig. 2 is an elevation, partly in section, taken at right angles to the plane of Fig. 1;

Fig. 3 is a view similar to Fig. 1 but illustrating a modified form of my invention; and Fig. 4 is a fragmental elevation taken at right angles to the plane of Fig. 3.

Referring more particularly to the drawing, it will be seen that I have illustrated a retainer ring 10 carrying a plurality of rollers 11, each of said rollers having a portion of its peripheral surface projecting beyond each peripheral surface of the ring 10.

Each roller 11 is mounted in a slot 12, and, as is clearly shown in Figs. 1 and 2, the ring 10 is provided with a series of such slots spaced peripherally about the ring and extending radially therethrough.

The retainer ring is formed of a hard, highly resilient metal, such as bronze or hard brass, or other material of similar characteristics. In the construction of the bearing, the various slots 12 are suitably formed, being of rectangular cross section, and having peripheral extent slightly less than the diameter of the rollers 11 to be inserted therein, and an axial extent slightly greater than the axial length of the rollers. Thereafter, the radially extending walls 13 and 13' of the slots are formed or cut upon radii of an axis which is radial with respect to the ring, thus forming cut-out portions 14 in the peripherally spaced walls 13, and cut-out portions 16 in the axially spaced walls 13' of each slot. The peripherally spaced walls 13 are further formed or cut upon radii of an axis parallel with the axis of the ring to form cut-out portions 15 therein.

Thereafter, the rollers 11, which are also of hard, highly resilient material, are forced into the slots, each roller being moved radially of the ring, and in a direction perpendicular to the axis of the roller, into its slot. Such insertion is permitted by the resilient character of the metal of the ring 10, such metal springing back into its normal position as soon as the roller has entered the slot, to hold the roller in place.

It will be seen that, with this arrangement, the area of contact of each roller with the metal of the ring 10 is limited to regions adjacent the under-cut portions of the walls of the slot, and adjacent the ends of the roller, the walls of the slot being relieved from contact with the rollers over the major portions of their areas.

In Figs. 3 and 4 I have illustrated a modified form of my invention in which the axial width of the ring 18 is sufficient to accommodate two axially spaced series of rollers, one of said series being indicated by the numeral 21 and the other by the numeral 22. The rollers 21 are received in slots 19, while the rollers 22 are received in slots 20, both series of slots 19 and 20 being formed in the manner described in respect to the slots 12.

I claim as my invention:

1. The method of forming a roller bearing which comprises the steps of taking a plurality of rollers of hard, resilient metal, taking a retaining ring of hard, resilient metal, forming in said ring a plurality of peripherally spaced radially extending slots, the peripheral extent of each of said slots being slightly less than the diameter of the roller to be inserted therein, the radial extent of each of said slots being slightly less than said diameter, and the axial extent of each of said slots being slightly greater than the length of the roller to be inserted therein, cutting in each of said slots a cylindrical enlargement upon an axis radial with respect to said ring, cutting in each of said slots a cylindrical enlargement upon an axis parallel with the axis of said ring, and forcing a roller into each of said slots, moving each roller into its slot in a direction perpendicular to the axis of said roller.

2. The method of forming a roller bearing which comprises the steps of taking a plurality of rollers of hard, resilient metal, taking a retaining ring of hard, resilient metal and of a radial thickness only slightly less than the diameter of said rollers, forming in said ring a plurality of peripherally spaced radially extending slots, the peripheral extent of each of said slots being slightly less than the diameter of the roller to be inserted therein and the axial extent of each of said slots being slightly greater than the length of the roller to be inserted therein, cutting in each of said slots a cylindrical enlargement of a diameter greater than the peripheral width of said slot, but less than the length of a diagonal extending between opposite corners of said slot upon an axis radial with respect to said ring, cutting in each of said slots a cylindrical enlargement of a diameter greater than the peripheral width of said slot, but less than the length of a diagonal extending between opposite corners of said slot upon an axis parallel with the axis of said ring, and forcing a roller into each of said slots, moving each roller into its slot in a direction perpendicular to the axis of said roller.

3. The method of forming a roller bearing which comprises the steps of taking a plurality of rollers of hard, resilient metal, taking a retaining ring of hard, resilient metal, forming in said ring a plurality of peripherally spaced radially extending slots, the peripheral extent of each of said slots being slightly less than the diameter of the roller to be inserted therein and the axial extent of each of said slots being slightly greater than the length of the roller to be inserted therein, cutting in each of said slots a cylindrical enlargement of a diameter greater than the peripheral width of said slot and greater than the axial length of said slot, but less than the length of a diagonal extending between opposite corners of said slot upon an axis radial with respect to said ring, cutting in each of said slots a cylindrical enlargement of a diameter greater than the peripheral width of said slot, but less than the length of a diagonal extending between opposite corners of said slot upon an axis parallel with the axis of said ring, and forcing a roller into each of said slots, moving each roller into its slot in a direction perpendicular to the axis of said roller.

JAMES P. JOHNSON.